March 29, 1927.  1,622,912
J. JOHNSON
SHOCK ABSORBING DEVICE FOR THE HANDLE BARS OF CYCLES AND THE LIKE
Filed Sept. 8, 1925

Inventor.
Joseph Johnson.
Per:- Bright & Bailey
Attorneys.

Patented Mar. 29, 1927.

1,622,912

UNITED STATES PATENT OFFICE.

JOSEPH JOHNSON, OF BIRMINGHAM, ENGLAND.

SHOCK-ABSORBING DEVICE FOR THE HANDLE BARS OF CYCLES AND THE LIKE.

Application filed September 8, 1925, Serial No. 55,134, and in Great Britain March 25, 1925.

This invention relates to a shock absorbing device for use in connection with the handle bars of motor cycles, pedal cycles and like velocipedes, the object of the invention being to provide means whereby the shock at present transmitted to the rider's arms owing to the present practice of rigidly connecting the handle bars to the steering columns is considerably reduced.

Broadly my invention is characterized by the provision of shock absorbing means between the steering column to which the handle bar is connected, and the hand grips or the part of the handle bar adapted to be gripped by the rider.

According to this invention a shock absorbing device for the purpose specified, briefly may be said to comprise a housing accommodating resilient means, said housing being adapted to be connected to a part of the handle bar, the resilient means being adapted to have connected to it a part of the handle bar which is adapted to be held by a rider.

The housing preferably comprises a cylindrical structure having axial holes in the opposing walls through one of which part of the handle end of the handle bar is adapted to be inserted and secured to a spring inside the housing, the other part of the handle bar being connected to the housing by being inserted in the other axial hole.

In order that this invention may be clearly understood and readily carried into effect I have appended hereto a sheet of drawings illustrating same wherein:—

Figure 1:
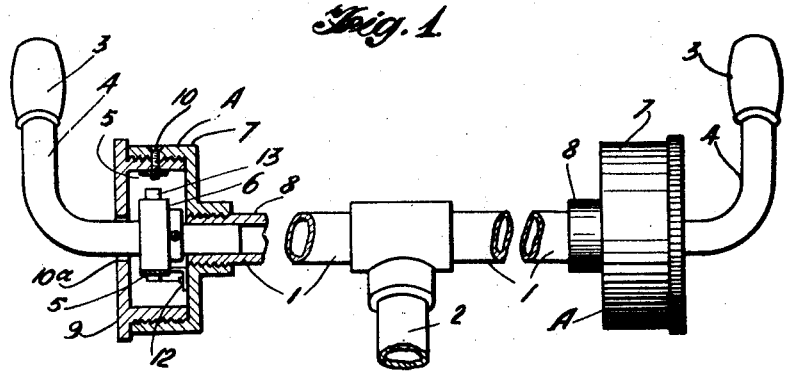
Fig. 1 is a somewhat diagrammatic front elevation partly in section.
Figure 2:
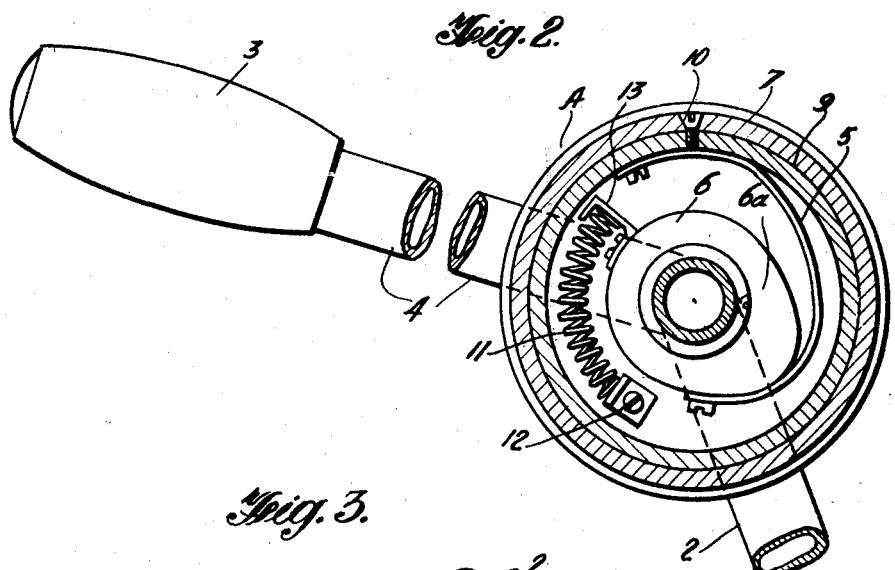
Fig. 2 is an enlarged section side view.

Referring to the drawings in Fig. 1 a conventional configuration of push cycle handle bars is shown, comprising a central horizontal portion 1 united to the steering column 2 and having hand grips 3. The hand grips are carried by the usual cranked portion 4 the inner ends of which are of smaller diameter than the portion 1 of the handle bar so that they may fit evenly therein to provide for a turning action of the cranked portion 4 about the axis of the portion 1. By providing a resilient device between the part 1 and the part 4 a considerable amount of shock which would otherwise be transmitted to the hand grips will be absorbed and thereby avoid shock to the rider. A suitable method of effecting this is by means of a convolute spring 5 one end of which is attached to the periphery of a disc 6 locked to the part 4 of the handle bar, the other end being secured to the inner periphery of a box A secured to the part 1 of the handle bar. The cranked part 4 of the handle bar is capable of turning inside the box A within the limits of the action of the spring 5 being sufficiently strong to hold the hand grip part of the handle bar in normal position under the ordinary pressure or weight applied by the rider. The box A comprises two parts, one part 7 comprising a cylindrical cup shaped element having a central boss 8 screw threaded or provided with other suitable means whereby it can be rigidly and nonrotatably secured to one end of the part 1 of the handle bar. Threaded into the part 7 is a cylindrical cup shaped portion 9, a grub screw 10 if desired locking the two parts 7 and 9 together. An axial opening 10ª enables the part 4 of the handle bar to be inserted through the box A into the part 1 of the handle bar.

If desired a strong coiled spring 11 may be provided as an alternative or addition to the spring 5, connected at one end by means of a suitable bracket or lug 12 to the part 7 of the box A, and at the other end by means of a lug or bracket 13 to the disc 6.

The disc 6 is preferably formed with an eccentric or cam portion 6ª to provide a good pull on the spring 5.

Figure 3:
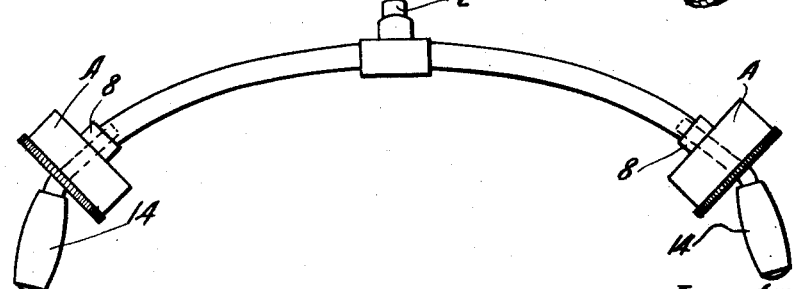
Fig. 3 is a plan view showing the application of my invention to one form of motor cycle handle bar.

When handle bars which are curved for most of their length are desired, or when the part 1 is curved or cranked at the outer ends, as in Fig. 3, the hand grips 14 (Fig. 3) cannot conveniently be substantially at right angles to the part 1 as in Fig. 1. However the hand grips can be at a small angle, for instance 30° from the axial direction of the outer ends of the part 1 of the handle bar, or may be in the same axial direction. If the latter is the case, a resilient action can be obtained if the hand grips slope downwards, but if the hand grips are at a small angle as shown in Fig. 3 with the axis of the ends of the part 1, both a turning and axial resilient action can be obtained.

What I claim is:—

1. In a vehicle steering apparatus, a steering column, a handle bar rigidly secured to said steering column, said handle bar being hollow throughout at least a portion of its length, a hand grip member including a portion axially alined with, snugly fitting within, and rotatable with respect to said handle bar, a housing mounted rigidly on said handle bar and surrounding a portion of said hand grip member, and a spring within said housing connected at one end to said housing and at its other end to said hand grip member.

2. In a vehicle steering apparatus, a steering column, a handle bar rigidly secured to said steering column, a hand grip member including a portion axially alined with, snugly interfitted with, and rotatable with respect to said handle bar, a housing rigid with said handle bar enclosing a portion of said hand grip member, a cam shaped member rigid with said hand grip member within said housing, and a leaf spring secured at one end to said member and at its other end to said housing.

J. JOHNSON.